United States Patent
Feser

(10) Patent No.: US 11,187,335 B2
(45) Date of Patent: Nov. 30, 2021

(54) FAST-SWITCHING 2/2-WAY CARTRIDGE VALVE

(71) Applicant: Robert Bosch GmbH, Stuttgart (DE)

(72) Inventor: Hubert Feser, Gemuenden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/931,595

(22) Filed: Jul. 17, 2020

(65) Prior Publication Data

US 2021/0018107 A1   Jan. 21, 2021

(30) Foreign Application Priority Data

Jul. 19, 2019   (DE) .......................... 102019210744.3

(51) Int. Cl.
| | | |
|---|---|---|
| *F16K 11/07* | (2006.01) | |
| *F16K 15/20* | (2006.01) | |
| *F16K 17/18* | (2006.01) | |

(52) U.S. Cl.
CPC ............ *F16K 15/207* (2013.01); *F16K 17/18* (2013.01); *F16K 11/0716* (2013.01); *Y10T 137/86702* (2015.04)

(58) Field of Classification Search
CPC .................. Y10T 137/8663; Y10T 137/86702
USPC ................................................ 251/63.5, 63.6
See application file for complete search history.

(56) References Cited

U.S. PATENT DOCUMENTS

| | | | | |
|---|---|---|---|---|
| 1,785,289 | A * | 12/1930 | Wilson .................... | F16K 39/04 137/625.68 |
| 4,491,153 | A * | 1/1985 | Bartholomaus .... | G05D 16/2024 137/625.65 |
| 5,778,932 | A * | 7/1998 | Alexander ......... | G05D 16/2024 137/625.65 |
| 5,868,160 | A * | 2/1999 | Cords ..................... | F16K 27/02 137/454.6 |
| 6,289,921 | B1 * | 9/2001 | Neuhaus ............... | F15B 13/044 137/454.5 |
| 2011/0132472 | A1 * | 6/2011 | Bassoli ............... | F15B 11/0445 137/485 |
| 2011/0278488 | A1 * | 11/2011 | Feser ..................... | F16K 27/02 251/324 |
| 2012/0012773 | A1 * | 1/2012 | Fischer ............... | F16K 31/0613 251/321 |
| 2018/0080568 | A1 * | 3/2018 | Bruck ................. | F16K 31/0613 |

OTHER PUBLICATIONS

"2-Wege-Einbauventil, aktiv ansteuerbar Typ LC2A," Rexroth Bosch Group, RD 21040 and English language version RE 21040, Edition May 2017, (72 pages).

* cited by examiner

*Primary Examiner* — Robert K Arundale
(74) *Attorney, Agent, or Firm* — Maginot, Moore & Beck LLP

(57) ABSTRACT

In a fast-switching 2/2-way cartridge valve, which can serve as a check valve, a closing movement of the closing body thereof is damped by contact portions which lie on one another and are movable in relation to one another during the closing movement. The contact portions are formed on the closing body and on the valve bore in which the closing body is guided.

12 Claims, 3 Drawing Sheets

A

B

FAST-SWITCHING 2/2-WAY CARTRIDGE VALVE

This application claims priority under 35 U.S.C. § 119 to application no. DE 10 2019 210 744.3, filed on Jul. 19, 2019 in Germany, the disclosure of which is incorporated herein by reference in its entirety.

The disclosure relates to a fast-switching 2/2-way cartridge valve.

BACKGROUND

The document "2-way cartridge valve, actively controllable type LC2A", with the number RD21040 belonging to the applicant and dated May 2017 discloses a 2/2-way cartridge valve. It has a high pressure port and a low pressure port which can be separated from each other or connected to each other.

The pressure fluctuations arising because of rapid closing cause a control spool to lift off repeatedly briefly from a seat ring. The high pressure can be built up only with a delay because of the leakages arising via the seat region. The impact of the control spool, caused by the rapid closing, on the seat ring has to be damped. A standard damping means is not possible in the seat region since there, when the control spool is retracted into the damping means, an operative surface would be formed in the opening direction of the control spool, which would again open the control spool and which therefore has to be avoided.

SUMMARY

By contrast, the disclosure is based on the object of providing a fast-switching 2/2-way cartridge valve which reduces or avoids the aforementioned disadvantages.

This object is achieved by a fast-switching 2/2-way cartridge valve with the features described herein.

Further advantageous refinements of the disclosed cartridge valve are described in the following description.

The disclosed fast-switching 2/2-way cartridge valve is of poppet valve design and has a housing in which a control spool is guided and on which a seat ring for the control spool is formed. According to the disclosure, an end position damping means for a closing movement of the control spool is formed by means of an outer casing portion of the control spool—preferably in a shoulder region of the control spool—and an inner casing portion of the valve housing. The high impact energy arising because of the rapid closing is dissipated by the damping means according to the disclosure. Closing times<10 ms of the cartridge valve can thus be realized.

This damping means has the advantage over the conventional damping pins in the seat region that an operative surface cannot be formed in the opening direction in the high pressure region of the cartridge valve. At the same time, a possible pulling tight of the cartridge valve when the flow passes through it from the high pressure port to the low pressure port can also be prevented.

According to two different exemplary embodiments, the two casing portions (of the damping means) can be (shaped) conically or circular-cylindrically. In the first exemplary embodiment, a conically designed region of the control spool moves into a likewise conically designed socket of the valve housing, which valve housing may be a sleeve. Depending on the desired damping effect, the damping length, damping angle and damping gap may be formed differently. According to a second exemplary embodiment, the damping means can be formed cylindrically. Depending on the desired damping effect, the damping length and damping gap may be formed differently.

If the cartridge valve is embodied as a check valve, it can very rapidly (e.g. <10 ms) separate the high pressure port from the low pressure port. The check valve according to the prior art has closing times which are too long (approx. 20 ms). Short closing times of this type are advantageous particularly in diecasting machines, and therefore the check valve is preferably configured for a diecasting machine.

The valve housing can be a sleeve or a tube at least in sections or in the manner of a sleeve or tubular. The inner casing portion is then formed at an end portion of the valve housing, said end portion being arranged opposite a seat region. Said end portion is preferably inserted into a valve block of the cartridge valve.

In a particularly preferred development, in the seat region an overlap is provided between the valve housing and the control spool, said overlap acting in a closing or shutting-off manner between the high pressure port and the low pressure port. The overlap limits to a minimum the leakage from the high pressure port to the low pressure port when the control spool briefly lifts off.

If the seat ring of the valve housing and/or a seat ring of the control spool are conical, the overlap is preferably formed by a control-spool-side overlapping portion adjacent to the seat ring of the control spool and a valve-housing-side overlapping portion adjacent to the seat ring of the valve housing.

The two overlapping portions are particularly preferably circular-cylindrical. The overlap is therefore realized by a circular-cylindrical socket for the control spool seat. An overlapping length and the gap are designed in such a manner that as little leakage as possible arises between the two ports when the control spool briefly lifts off.

If radial bores which form the high pressure port are provided in the valve housing, the valve-housing-side overlapping portion is arranged between the seat ring of the valve housing and the radial bores.

The control spool can be provided with a through recess via which two mutually opposite end sides of the control spool are connected to each other. The end-side low pressure port is connected to a spring chamber via the through recess. For manufacturing reasons, the through recess is preferably concentric.

A control pressure can keep the cartridge valve open. The cartridge valve is closed by deactivation of the control pressure. A rapid closing time is achieved by the narrowest point of the through recess—preferably central bore—in the control spool being as large as possible. A rapid exchange of fluid and pressure between the low pressure port and the spring chamber is thereby achieved.

A radius of the through recess at its narrowest point is, for example, at least 45% (preferably at least 50%) of the radius of the control spool at the same point. A reduction in the mass of the control spool is therefore achieved, which facilitates the rapid closing.

The cartridge valve can be a check valve which is pretensioned by a spring. The narrowest point of the through recess is then preferably formed by an inner radial shoulder which extends inwards and via which the spring acts upon the control spool with a closing force.

Adhering of the control spool to the valve block or to a cover and switching which is thereby delayed are avoided by as small a contact surface as possible for the opening position, the contact surface being smaller than an annular cross-sectional area of the control spool in the region of the spring.

For the (further) reduction in the mass, the control spool can additionally also be hollowed out by turning. In this case, a portion of the through recess is formed between the inner radial shoulder and the seat ring of the control spool, the radius of which portion is, for example, at least 65% (preferably at least 70%) of the radius of the control spool at the same point.

BRIEF DESCRIPTION OF THE DRAWINGS

An exemplary embodiment of the fast-switching 2/2-way cartridge valve according to the disclosure is illustrated in the figures, in which.

DETAILED DESCRIPTION

Figure 1:
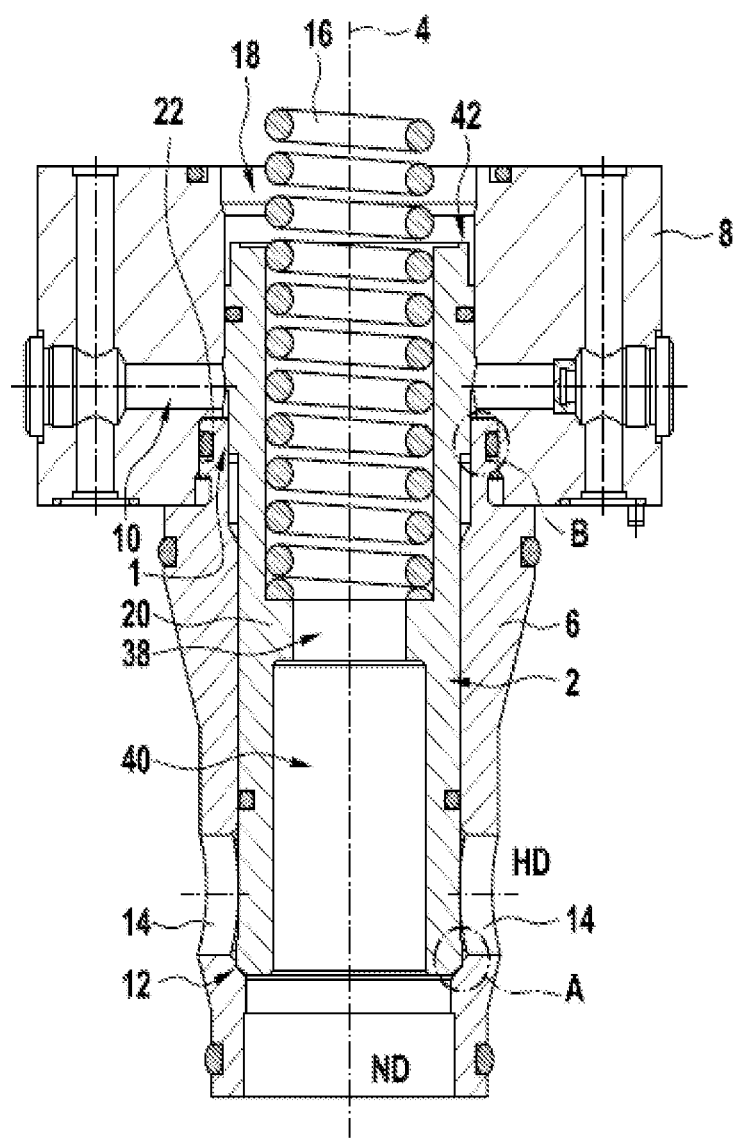
FIG. 1 shows, in a longitudinal section, the first exemplary embodiment of the fast-switching 2/2-way cartridge valve according to the disclosure.

FIG. 1 shows, in a longitudinal section, a fast-switching 2/2-way cartridge valve with a damping means 1 according to the disclosure for a closing movement (directed downwards in FIG. 1) of the control spool 2 of said cartridge valve. The control spool 2 is substantially rotationally symmetrical with respect to a longitudinal axis 4 and is shown here in its closed position (at the bottom in FIG. 1).

The control spool 2 is designed in the manner of a sleeve and is guided here in a valve bore of a valve housing 6. The valve housing 6 is inserted at its end portion 22 (at the top in FIG. 1) into a valve block 8 in which a control pressure line 10 is formed. Furthermore, the valve block 8 also forms a part (at the top in FIG. 1) of the valve bore in which the control spool 2 is guided.

The cartridge valve has, at its end portion (at the bottom in FIG. 1) opposite the valve block 8, a seat region 12 which blocks off a high pressure port HD in relation to a low pressure port ND in the closed position of the control spool 2. The high pressure port HD is in the form of a radial bore star with a plurality of radial bores 14 in the valve housing 6, with only two radial bores 14 being illustrated in FIG. 1. The low pressure port ND is formed as an end-side opening (at the bottom in FIG. 1) of the sleeve-like valve housing 6.

Figure 2:
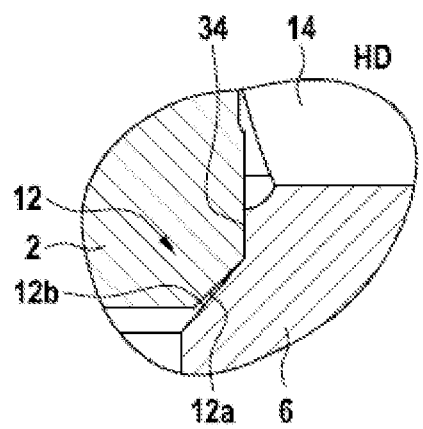
FIG. 2 shows a detail from FIG. 1 with an overlap.

FIG. 2 shows the seat region 12 in an enlarged illustration A. It can be seen that a control-spool-side seat ring 12a and a valve-housing-side seat ring 12b are arranged in the seat region 12, said seat rings being pressed onto each other in the closed position shown in FIGS. 1 and 2. The two seat rings 12a, 12b are in the shape of truncated cones.

It is illustrated in FIG. 1 that a spring 16 is arranged largely in the interior of the control spool 2 and of the valve block 8. In more precise terms, a spring chamber 18 is provided for the spring 16, a larger part of said spring chamber being bounded by the control spool 2 and a smaller part by the valve block 8. The spring 16 is supported on a cover (not shown in FIG. 1) and pretensions the control spool 2 via an inner radial shoulder 20 of the control spool 2 into the closed position.

Figure 3:
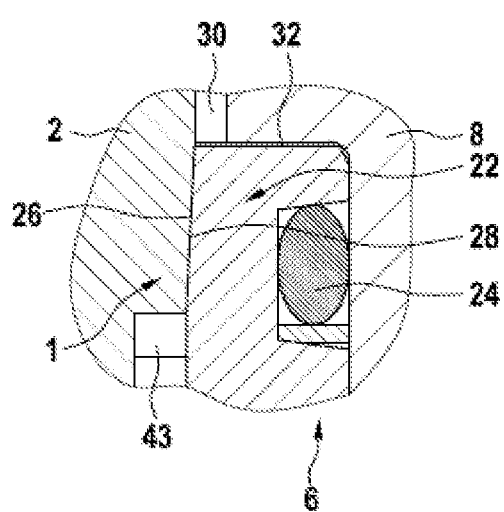
FIG. 3 shows a detail from FIG. 1 with a damping means.

FIG. 3 shows an enlargement B of a detail of the end portion 22 of the valve housing 6, the outer diameter of which is reduced and which is inserted with a centering effect into the valve block 8 and is sealed here by a seal 24. The valve block 8 and the sleeve-like valve housing 6 thus together form the valve bore, already discussed, for the control spool 2.

The damping means 1 according to the disclosure is formed at the end portion 22 of reduced outside diameter. For this purpose, an inner casing portion 26 of the end portion 22 in the shape of a truncated cone interacts with an outer casing portion 28 of the control spool 2 that is likewise in the shape of a truncated cone.

The two casing portions 26, 28 that are in the form of truncated cones have an identical (small) inclination or steepness with respect to the longitudinal axis 4. The inclination or steepness is, for example, <7 degrees. The casing portions 26, 28 are arranged here in such a manner that their respective smaller diameter faces the seat region 12 while the respective larger diameter faces the valve block 8.

The two casing portions 26, 28 (as shown in FIG. 3) preferably extend from a control pressure chamber, which is formed on the outer circumference of the control spool 2, as far as an end surface 32 of the end portion 22 of the valve housing 6, on which end surface the control pressure chamber 30 is also arranged.

If the control spool 2 is pushed from the closed position (shown in FIG. 3), in which the two casing portions 26, 28 form only a minimal gap in the shape of a truncated cone, into the opening position (upwards in FIG. 3), the gap between the two casing portions 26, 28 is increased and the control pressure chamber 43 is filled with pressure medium from the control pressure chamber 30. During the closing operation, first of all the control pressure chambers 43 and 30 are connected to each other, and therefore the fluid can flow off unobstructed from the control pressure chamber 43 via control pressure chamber 30 and via the control pressure line 10. After approx. 60%-70% of the stroke, the conical portion of the control spool 2 retracts into the conical portion of the valve housing 6 and a damping gap arises which becomes continuously narrower and longer during the further closing operation. The damping gap is therefore at the narrowest shortly before the impact of the control spool 2 and an ever greater counterpressure is built up in the control pressure chamber 43, the counterpressure damping the impact of the control spool 2. It is advantageous to design the damping in such a manner that it is at its most effective when the control spool 2 retracts into the overlapping portion 34. The closing speed (and therefore the impact energy) of the control spool 2 is therefore reduced only when the high pressure region HD is substantially separated from the low pressure region ND by the overlap 34/36.

Depending on the desired damping action, the length of the two casing portions 26, 28 along the longitudinal axis 4 (shown in FIG. 1) of the cartridge valve, the discussed angle of the two casing portions 26, 28 in the shape of truncated cones and the gap which remains in the closed position, shown in FIG. 3, of the control spool 2 can be designed differently.

Figure 4:
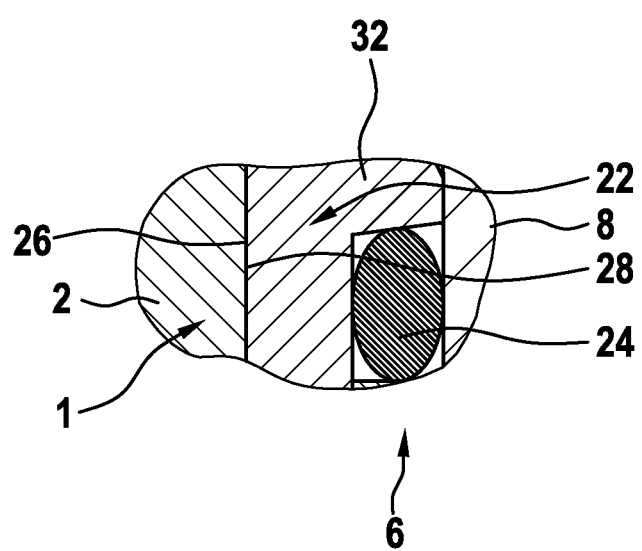
FIG. 4 shows a detail from FIG. 1 with another embodiment of a damping means.

According to a differing exemplary embodiment shown in FIG. 4, the two casing portions 26, 28 forming the damping 1 can also be designed to be circular-cylindrical.

FIG. 2 shows an overlap in the seat region 12, said overlap being realized by a cylindrical socket for the end portion of the control spool 2. The cylindrical socket may also be referred to as a valve-housing-side overlapping portion 34 which interacts with a corresponding control-spool-side overlapping portion 36 and therefore forms the overlap. The effect therefore achieved is that, in the event of a possibly remaining brief lifting of the control spool 2 from the valve-housing-side seat ring 12b upon rapid closing of the cartridge valve, minimal leakage, if any at all, occurs between the two ports HD, ND.

FIG. 1 shows a through recess 38 which is enlarged in comparison to the prior art and, in the exemplary embodiment shown, extends concentrically with respect to the longitudinal axis 4 and which completely passes through the control spool 2. The spring chamber 18 is connected to the low pressure port ND via the through recess 38. The through recess 38 has a narrowest point which is defined by the radial shoulder 20 and the radius of which is at least 50% of the radius of the control spool 2 (at the same point). The radial shoulder 20 separates the spring chamber 18 from a portion 40 of the through recess 38 that extends from the narrowest point 38 as far as the seat region 12.

A cross section of the portion 40 of the through recess 38 (perpendicular to the longitudinal axis 4) is significantly enlarged in comparison to the cross section of the prior art in this region. The mass of the control spool 2 is therefore reduced, as a result of which the rapid and secure closing of the control spool 2 is significantly aided.

Furthermore, a circular-ring-shaped contact surface 42 is formed on the end side of that end portion of the control spool 2 which faces away from the seat region 12, said contact surface in the open position (not shown in FIG. 1) of the control spool 2 lying against the cover (likewise not shown in FIG. 1) of the cartridge valve and facilitating detaching of the control spool 2 from the cover during the rapid closing movement.

A fast-switching 2/2-way cartridge valve which can serve as a check valve is disclosed. A closing movement of the closing body of said cartridge valve is damped by contact portions lying on one another and being movable in relation to one another during the closing movement. The contact portions are formed on the closing body and on the valve bore in which the closing body is guided.

The invention claimed is:

1. A 2/2-way cartridge valve of poppet valve design comprising:
   a control spool;
   a valve housing in which the control spool is guided, the valve housing including a first seat ring for the control spool; and
   a damping arrangement for a closing movement of the control spool, the damping arrangement including an outer casing portion of the control spool and an inner casing portion of the valve housing.

2. The cartridge valve according to claim 1, wherein said cartridge valve is a check valve.

3. The cartridge valve according to claim 1, wherein:
   the valve housing is configured at least partially as a sleeve or a tube; and
   the inner casing portion is formed at an end portion of the valve housing, said end portion lying opposite a seat region of the cartridge valve.

4. The cartridge valve according to claim 1, wherein the inner and outer casing portions of the damping arrangement are conical.

5. The cartridge valve according to claim 1, wherein the inner and outer casing portions of the damping arrangement are cylindrical.

6. The cartridge valve according to claim 1, further comprising:
   a high pressure port; and
   a low pressure port,
   wherein an overlap between the valve housing and the control spool is configured to shut-off a connection between the high pressure port and the low pressure port.

7. The cartridge valve according to claim 6, wherein:
   the control spool includes a second seat ring;
   the first and second seat rings are conical; and
   the overlap is formed by a control-spool-side overlapping portion adjacent to the second seat ring of the control spool and by a valve-housing-side overlapping portion adjacent to the first seat ring of the valve housing.

8. The cartridge valve according to claim 7, wherein:
   the high pressure port is formed by radial bores defined in the valve housing; and
   the valve-housing-side overlapping portion is arranged between the first seat ring of the valve housing and the radial bores.

9. The cartridge valve according to claim 1, wherein the control spool defines a through recess via which two mutually opposite end sides of the control spool are connected to each other.

10. The cartridge valve according to claim 9, wherein the through recess has a radius at a narrowest point of the through recess that is at least 45% of a second radius of the control spool.

11. The cartridge valve according to claim 10, wherein the narrowest point of the through recess is formed by an inner radial shoulder which extends inwardly, and the cartridge valve further comprises a spring, which acts, via the inner radial shoulder, on the control spool with a closing force.

12. The cartridge valve according to claim 11, wherein:
   the control spool includes a second seat ring; and
   a portion of the through recess is defined between the inner radial shoulder and the second seat ring, the portion having a third radius that is at least 60% of the second radius of the control spool.

\* \* \* \* \*